United States Patent [19]

Bibby

[11] Patent Number: 4,767,219

[45] Date of Patent: Aug. 30, 1988

[54] LIGHT SCATTERING TEMPERATURE MEASUREMENT

[75] Inventor: Geoffrey W. Bibby, Leatherhead, United Kingdom

[73] Assignee: Central Electricity Generating Board, England

[21] Appl. No.: 823,847

[22] Filed: Jan. 29, 1986

[30] Foreign Application Priority Data

Feb. 1, 1985 [GB] United Kingdom ............... 8502558

[51] Int. Cl.$^4$ ............... G01J 03/30; G01J 05/60; G01N 21/00
[52] U.S. Cl. ................... 374/123; 250/340; 356/44; 356/301; 374/126; 374/131; 374/160
[58] Field of Search ............. 374/131, 123, 160, 161, 374/126, 123; 356/301, 44

[56] References Cited

U.S. PATENT DOCUMENTS

| | | | |
|---|---|---|---|
| 3,622,243 | 11/1971 | Wada | 356/301 |
| 3,909,132 | 9/1975 | Barrett | 356/301 |
| 4,057,349 | 11/1977 | Barrett | 356/301 X |
| 4,105,337 | 8/1978 | Bjorklund et al. | 356/301 X |
| 4,298,794 | 11/1981 | Snitzer et al. | 374/161 X |
| 4,302,970 | 12/1981 | Snitzer et al. | 374/161 |
| 4,316,388 | 2/1982 | Miller et al. | 374/161 |
| 4,342,907 | 8/1982 | Macedo et al. | 374/131 X |
| 4,365,896 | 12/1982 | Mihalow | 374/123 X |
| 4,405,237 | 9/1983 | Manuccia et al. | 356/301 |
| 4,483,614 | 11/1984 | Rogers | 356/301 X |
| 4,531,230 | 7/1985 | Brogardh | 250/227 X |
| 4,542,987 | 9/1985 | Hirschfeld | 374/161 X |
| 4,545,253 | 10/1985 | Avicola | 250/227 X |
| 4,575,259 | 3/1986 | Bacci et al. | 374/161 X |
| 4,576,485 | 3/1986 | Lambert | 374/161 X |
| 4,621,929 | 11/1986 | Phillips | 374/131 X |

FOREIGN PATENT DOCUMENTS 2140554 11/1984 United Kingdom ............... 374/131

OTHER PUBLICATIONS

"Ultrasonic Testing", J. Szilard, TA 417.4 44 1982 pp. 190–191, 402–407, 374–1177.

Primary Examiner—Daniel M. Yasich
Attorney, Agent, or Firm—Beveridge, DeGrandi & Weilacher

[57] ABSTRACT

Temperature is measured by launching pulses of light into an elongate optical fibre and determining the temperature at positions along the fibre from the intensity of light scattered at those positions. The input pulses can have either the same or two different wavelengths, and the scattered light can be either Raman or Brillouin scattered and either forward scattered or backscattered. One position along the fibre can be maintained at a known temperature in order to provide a reference for other calculations. In particular embodiments the temperature is derived from the ratio between the intensities at two anti-Stokes wavenumber shifts or between an anti-Stokes scattered and a Rayleigh scattered intensity measurement. Otherwise the intensities of Stokes and anti-Stokes shifted Brillouin back scattered light can be used to derive the temperature.

26 Claims, 1 Drawing Sheet

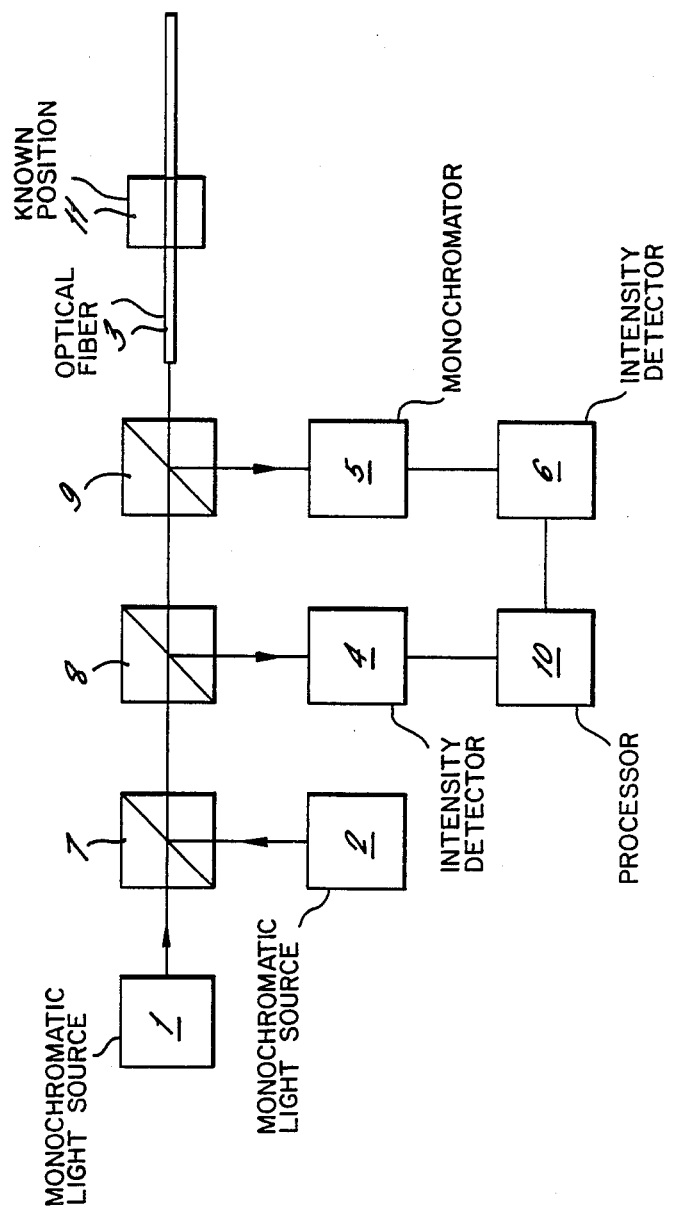

LIGHT SCATTERING TEMPERATURE MEASUREMENT

BACKGROUND OF THE INVENTION

This invention relates to a method of measuring temperature, and in particular to a method of measuring temperature using optical time domain reflectometry (OTDR).

Such a method of temperature measurement involves the launching of short pulses of light into one end of an optical fibre temperature sensing element, and then detecting the intensity of the backscattered light at a position at or close to the launch end of the optical fibre. The spectrum of the backscattered light will include a major component at or near the wavelength of the input pulses due to Rayleigh, Mie and Brillouin scattering, and will also include weaker components at significantly longer and shorter wavelengths due to Stokes and anti-Stokes Raman scattering, respectively. There may also be some longer wavelength fluorescence component in the backscattered light The time of receipt of backscattered light at the detection position relative to the time of input pulse launch is dependent upon the distance from the pulse input position that scattering occurred, and thus the temperature at different positions along the optical fibre sensing element can be measured by taking into account such time delay.

In British Patent Application No. 2,140,554, published on Nov. 28, 1984, there is disclosed such an optical time domain reflectometry (OTDR) temperature measuring method in which the Rayleigh and Mie and Brillouin wavelengths are filtered out of the backscattered light, while the Stokes and anti-stokes Raman wavelengths are fed to detecting and processing apparatus which calculates therefrom the temperature at the position from which the light was backscattered.

This known method uses input pulses of a single wavelength, with temperature measurement being carried out by calculation of the ratio of backscattered light intensity at the Stokes and anti-Stokes Raman wavelengths only.

As disclosed, a laser, for example a semi-conductor laser is used as an input pulse source, while a dichromator is used to effect the necessary filtering of the backscattered light, the dichromator passing the Stokes and anti-Stokes Raman wavelengths to two separate detectors, respectively.

This known method and apparatus have a number of disadvantages.

Firstly, the efficiency of the dichromator, or other device, used to effect the necessary filtering of the backscattered light, and the response of the detectors used to determine the intensity may be different at the Stokes and anti-Stokes wavelengths.

Secondly, the disclosed apparatus takes no account of the likely difference in the attenuation of the backscattered light by the optical fibre at the Stokes and anti-Stokes wavelengths, which attenuation will progressively alter the intensity ratio as the backscattered light returns along the optical fibre. The alteration in the ratio is equivalent to an error in temperature measurement and will increase with increase in distance between the input end of the optical fibre and the position of scattering and temperature measurement.

Thirdly, there may be fluorescence produced in the fibre at wavelengths longer than the Rayleigh scattered wavelength, which fluorescence may interfere with the measurement of the Stokes Raman scattered light intensity.

Fourthly, the anti-Stokes Raman scattered light intensity at very low temperatures may be too low to give an adequate signal from the detector for use in determining the temperature measurement ratio.

SUMMARY OF THE INVENTION

According to the present invention there is provided a method of measuring temperature, comprising the steps of consecutively launching input pulses of light at two different wavelengths $\lambda_1$ and $\lambda_2$ into a temperature sensing element; passing scattered light from said element and deriving from said input pulses, at a third wavelength $\lambda_3$ intermediate said two different wavelengths, to an intensity detector, $\lambda_3$ being chosen such that $$1/\lambda_1 - 1/\lambda_3 = 1/\lambda_3 - 1/\lambda_2 = \nu$$

where $\nu$ is the Stokes shift in wavenumber units of the Stokes scattered light for a pulse of wavelength $\lambda_1$; obtaining from said detector output signals indicative of the intensity of the scattered light at said third wavelength deriving from said input pulses; and processing said output signals to provide a temperature measurement.

BRIEF DESCRIPTION OF THE DRAWING

This invention will now be described by way of example with reference to the drawing which is a block diagram of one embodiment of apparatus for use in carrying out the method of the invention.

DETAILED DESCRIPTION OF A PREFERRED EMBODIMENT

The apparatus comprises two sources 1 and 2 of monochromatic light at wavelengths $\lambda_1$ and $\lambda_2$ respectively. Otherwise a single source tunable to the two wavelengths can be used. Pulses of light from the sources 1 and 2 are launched into one end of an elongate optical fibre 3 which serves as a temperature sensing element, by way of a dichroic beamsplitter 7 which transmits light at wavelength $\lambda_1$ from source 1 and reflects light at wavelength $\lambda_2$ from source 2, a partially reflective beamsplitter 8, and a partially reflective beamsplitter 9.

Backscattered light from the fibre 3 is partially reflected by the beamsplitter 9 through a monochromator 5, or equivalent filter device, which passes only light at a wavelength $\lambda_3$ to an intensity detector 6. The remaining backscattered light is also partially reflected by the beamsplitter 8 to an intensity detector 4. The detectors 4 and 6 give output signals indicative of the intensity of the light passed thereto, which output signals are supplied to a processing means 10 operative to provide a temperature measurement therefrom, as will be described hereafter.

The fibre 3 is arranged to extend over a path along which temperature measurements are to be made. A known position 11 along the fibre 3 is maintained at a known temperature by any conventional means, such as a thermostatically controlled heating jacket. To provide the possibility of carrying out a reference calculation for temperature measurements at other positions along the fibre 3, as will also be described hereafter.

Pulses from the sources 1 and 2 are launched into the fibre 3 consecutively and the apparatus used to effect optical time domain reflectometry (OTDR) combined with Raman spectroscopy techniques, in accordance with the following principles.

The wavelength $\lambda_1$, $\lambda_2$ and $\lambda_3$ are set such that:

$$1/\lambda_1 - 1/\lambda_3 = 1/\lambda_3 - 1/\lambda_2 = \nu \quad (1)$$

where $\nu$ is the Stokes shift in wavenumber units of the Stokes Raman backscattered light derived from an input pulse of wavelength $\lambda_1$ launched into the fibre.

Thus, the detector 6 provides consecutively an output signal indicative of the Stokes Raman back-scattered light intensity at wavelength $\lambda_3$ derived from input pulses of wavelength $\lambda_1$ and an output signal indicative of the anti-Stokes Raman backscattered light intensity at wavelength $\lambda_3$ derived from input pulses of wavelength $\lambda_2$. Simultaneously the detector 4 provides output signals indicative of the total back-scattered light intensity, mainly from Rayleigh scattering, at the wavelengths $\lambda_1$ and $\lambda_2$ for the input pulses, respectively.

The time dependence of the output signals from the detectors 4 and 6 in relation to the input pulses is used in accordance with conventional OTDR techniques to determine the position along the fibre 3 from which the backscattered light has been received, and thus the position at which the temperature is being measured.

The intensity of light Raman scattered in the fibre 3, either Stokes or anti-Stokes shifted, varies with the temperature of the fibre in a well understood manner (see "Raman Spectroscopy" by D.A. Long, 1977). The ratio of the scattered light intensities varies exponentially according to the reciprocal of the absolute temperature at the position of scatter, for scattering at a given Raman shift $\nu$. The output signals from detector 6, corresponding to anti-Stokes or Stokes backscatter from the input pulses in turn can therefore be used to provide an indication of the temperature of the scattering position in the fibre. As in conventional OTDR measurements the time dependence of the Raman signals corresponds to the spatial dependence of Raman scattering in the fibre, so that the output signals from the detector 6 can be used to derive the temperature distribution along the fibre.

To provide accurate quantitative measurements of temperature, rather than just indications of temperature variations, it is necessary to process the output signals from the detector in an appropriate manner.

In conventional Raman scattering measurement of temperature an input pulse at a single wavelength $\lambda$ is used and the anti-Stokes and Stokes Raman scattered intensities are measured at different wavelengths $\lambda_a$ and $\lambda_s$ respectively.

When the wavelengths are related by the equation:

$$1/\lambda_a - \nu = 1/\lambda = 1/\lambda_s + \nu \quad (2)$$

(corresponding to equal anti-Stokes and Stokes shifts, $\nu$) the temperature-dependent ratio R(T) of the intensities is given by:

$$R(T) = I_a/I_s = (\lambda_s/\lambda_a)^4 \exp(-hc\nu/kT) \quad (3)$$

where
$I_a$, $I_s$ are the anti-Stokes and Stokes intensities
h is Planck's constant
k is Boltzmann's constant
c is the velocity of light
$\nu$ is the Raman shift in wavenumber units
and T is the absolute temperature.

However, the output signals corresponding to $I_a$ and $I_s$ depend on the spectral response function of the measuring equipment. The measured ratio M(T) of anti-Stokes signal divided by Stokes signal will generally differ from the $I_a/I_s$ intensity ratio by some unknown factor, F say, which must be found before temperature can be deduced according to the above equation (3).

With the method and apparatus of this invention two input pulse wavelengths $\lambda_1$ and $\lambda_2$ are used and the anti-Stokes and Stokes Raman shifted intensities therefrom are measured at a common wavelength $\lambda_3$. Since both the Raman scattered light intensities are measured at the same wavelength $\lambda_3$ by the same detector 6, the spectral response function of the monochromator and that detector need not be known.

In comparing the Raman signals to obtain a temperature measurement the relative intensities $I_1$ and $I_2$ of the input pulses at wavelengths $\lambda_1$ and $\lambda_2$ need to be considered. Signals from detector 4 correspond to these two intensities, but again the measured ratio of the signals will differ from the actual ratio of intensities according to the spectral response function of the apparatus, in particular detector 4.

One solution to these difficulties would be a measurement of the appropriate spectral response functions or input pulse intensities as part of an initial calibration of the apparatus. This approach has the disadvantages of inconvenience, especially if components later have to be adjusted or replaced, and introduces a risk of calibration errors if the spectral response function or input pulse intensities alter, through ageing of components or other causes.

A convenient and practical method which avoids the need to know the spectral response function or input pulse intensities is to maintain the section 11 of the fibre 3 at a known absolute temperature $\theta$ and make backscattered light measurements at this 'reference' position in the fibre, as well as at those positions where temperature is to be measured.

For conventional Raman scattering measurement, the measured ratio M($\theta$) for the reference position would be given by:

$$M(\theta) = F.R(\theta) \quad (4)$$

and for another 'measurement' position at an unknown temperature T:

$$M(T) = F.R(T) \quad (5)$$

From equation (3) it can be shown that:

$$1/T = 1/\theta - (k/hc\nu) \ln(M(T)/M(\theta)) \quad (6)$$

so that the unknown temperature can be found from $\theta$, $\nu$, fundamental physical constants and the measured Raman signal ratios at the 'reference' and 'measurement' positions in the fibre. The value of F need not be explicitly considered.

With the method and apparatus of this invention, instead of using signals from detector 4 corresponding to the input pulse intensities $I_1$ and $I_2$, the measured ratio S of Stokes backscatter signals from the 'measurement' and 'reference' positions in the fibre and the measured ratio A of the anti-Stokes backscatter signals from the same 'measurement' and 'reference' positions are used.

The temperature may be calculated from the relationship:

$$1/T = 1/\theta - (k/hcv) \ln (A/S) \qquad (7)$$

where $A = V_a(m)/V_a(r)$ and $S = V_s(m)/V_s(r)$, where V denotes the signal from detector 6 corresponding to anti-Stokes (a) or Stokes (s) scattering from the measurement (m) or reference (r) position in the fibre.

Only signals from detector 6 are required to derive temperature in this way.

Thus, for the conventional Raman spectroscopy method the ratios involve signals corresponding to different wavelengths ($\lambda_a, \lambda_s$) and kinds of scattering (Stokes or anti-Stokes) but for the same position in the fibre, while with the method of this invention the ratios involve signals corresponding to the same wavelength $\lambda_3$ and kind of scattering, but for different positions in the fibre (the 'reference' and the 'measurement' positions).

It has so far been implicitly assumed that attenuation of light by the fibre has no effect on the temperature measurements, except by reducing the light intensities, which might make measurement of the signals more difficult. However it will generally be the case that the attenuation of light by the fibre will depend on the wavelength of the light and that it will be different for the scattered wavelengths $\lambda_a$ and $\lambda_s$, or the input pulse wavelengths $\lambda_1$ and $\lambda_2$, for either the conventional Raman spectroscopy method, or the method according to this invention. These spectral attenuation differences will alter the ratios of the scattered intensities by a changing factor as the distance to the scattering position increases. The effect is to cause a systematic temperature error, which increases with distance if the fibre properties are constant throughout its length.

As before, one approach to this difficulty would be to measure the spectral attenuation characteristic of the fibre before use, as part of an initial calibration. Alternatively fibre could be specially chosen to have equal attenuations at the relevant wavelengths. However, these approaches have the same practical inconveniences as before: lack of interchangeability of sensors without recalibration or special selection and risk of error through unrecognised changes in spectral attenuation.

With the apparatus of this invention shown in the drawing spectral attenuation effects in the fibre may be measured using the total Rayleigh backscatter signals (corresponding to wavelengths $\lambda_1$ and $\lambda_2$) obtained from detector 4 as usual in OTDR measurements of attenuation. Appropriate corrections may then be applied to the anti-Stokes and Stokes backscatter signals from detector 6 before in the processing means 10 deriving the temperature distribution along the fibres.

Although in the method described above Raman scattering is utilised, it is otherwise possible to use Brillouin scattered light in a similar manner.

The relative intensities of anti-Stokes and Stokes-shifted Brillouin-scattered light in a fibre are also exponentially-dependent on absolute temperature, so that:

$$I_a/I_s = \exp(-hcv/kT) \qquad (8)$$

where $I_a$, $I_s$ are the anti-Stokes and Stokes Brillouin intensities and v is now the Brillouin wavenumber shift, (the $(\lambda_a/\lambda_s)^4$ factor can be ignored because the Brillouin shift is small, typically 1 cm$^{-1}$).

The relative intensities of Brillouin-scattered light may therefore be used to measure the temperature distribution along an optical fibre, or the mean temperature of an optical fibre, by methods analogous to those described for using Raman-scattered light.

The spectral analysis apparatus must have a correspondingly greater spectral resolution, which may be achieved by using a Fabry-Perot interferometer, for example. The light sources 1 and 2 must also be sufficiently monochromatic, such as a single-mode laser.

The use of Brillouin-scattered light is advantageous for measuring very low temperatures, where the intensity of anti-Stokes Raman-scattered light may become too low to provide adequate output signals.

The very small differences in source and scattered wavelengths also eliminate any effect of spectral attenuation differences in the fibre 3.

Although in the methods and apparatus described above input pulses at two different wavelengths are used, the use of a 'reference' position temperature measurement in the fibre is also advantageous when conventional methods using a single input pulse wavelength are used, since the need to know the spectral response function of the apparatus is again avoided.

Thus, also according to this invention there is provided a method of measuring temperature, comprising launching input pulses of light into a temperature sensing element and deriving the temperature at a position in the element from the intensity of light scattered at said position, in which a part of the element is maintained at a known temperature in order to provide a reference for deriving temperature measurements at other positions in the element.

Either Raman or Brillouin, forwardscattered or backscattered light can be used in such method.

Some optical fibres are known to fluoresce. Fluorescence is a common problem in Raman spectroscopy, since it may interfere with the measurement of the Stokes-shifted Raman-scattered light, since both are at longer wavelengths than the input pulse wavelength.

In making temperature measurements using an optical fibre sensor and Raman scattering it is possible to avoid interference from fluorescence by using only the anti-Stokes scattered light to make temperature measurements, since there is only significant fluorescence at wavelengths longer than that of the input pulse.

The ratio of two anti-Stokes scattered intensity signals measured at different anti-Stokes wavenumber shifts may be used, since the temperature dependencies at different wavenumber shifts are well-known. The calibration now requires knowledge of the Raman cross-section of the optical fibre material at different Raman shifts, but this can be eliminated as with the other spectral calibration factors by using additional measurements at reference positions in fibre at known temperature (as above described), or by a prior calibration measurement. Otherwise the ratio of an anti-Stokes scattered intensity signal and a Rayleigh scattered intensity signal may be used, to provide correction for attenuation effects in the fibre.

Thus, also according to this invention there is provided a method of measuring temperature, comprising launching input pulses of light into a temperature sensing element and deriving a temperature in the element from the intensity of backscattered light obtained from the element and deriving from the input pulses, in which the temperature is calculated from the ratio between two intensity measurements taken at two anti-Stokes wavenumber shifts, or between an anti-Stokes scattered intensity measurement and a Rayleigh scattered intensity measurement, in the backscattered light.

Again input pulses of either a single or two wavelengths can be used, with either Raman or Brillouin scattered light being used for the measurements.

As discussed above the use of Brillouin scattered light for temperature measurement purposes is advantageous for measuring very low temperatures where the intensity of anti-Stokes Raman scattered light may be too low to provide adequate output signals for processing.

The use of Brillouin scattered light gives the further advantage that the very small differences in wavelength between the input pulses and the scattered light substantially reduce the effect of spectral attenuation differences in the fibre.

The use of Brillouin scattering from input pulses of two different wavelengths is discussed above.

However, Brillouin scattering from input pulses of a single wavelength can also be used.

Thus, also according to this invention there is provided a method of measuring temperature, comprising the steps of launching input pulses of light of a single wavelength into a temperature sensing element; passing backscattered light from said element and deriving from said input pulses to intensity detector means; deriving from said detector means output signals indicative of the intensity of the Stokes and anti-Stokes shifted Brillouin backscattered light from said element; and processing said output signals to provide a temperature measurement.

I claim:

1. A method of measuring temperature sensed by a temperature sensing element comprising the steps of:
   applying to said temperature sensing element input pulses of light at two different wavelengths $\lambda_1$ and $\lambda_2$ to obtain scattered light from said temperature sensing element;
   detecting the scattered light;
   deriving from the detected scattered light signals indicative of the intensity of light within the scattered light occurring at a third wavelength intermediate $\lambda_1$ and $\lambda_2$, $\lambda_3$ being chosen such that $1/\lambda_1 - 1/\lambda_3 = \nu$ where $\nu$ is the Stokes shift in wavenumber units of the scattered light for a light pulse of wavelength $\lambda_1$; and
   processing the derived signals to provide a measurement of the temperature sensed by said temperature sensing element.

2. A method as claimed in claim 1, in which light at said third wavelength is Raman scattered light.

3. A method as claimed in claim 2, further comprising the steps of
   detecting backscattered light at wavelengths $\lambda_1$ and $\lambda_2$ from said temperature sensing element;
   deriving an additional output signal indicative of the intensity of the backscattered light; and
   compensating for effects of attentuation of light in said element according to the derived additional output signal.

4. A method as claimed in claim 1, in which an elongate optical fibre is used as the temperature sensing element, said input pulses being applied to one end thereof.

5. A method as claimed in claim 1, in which light at said third wavelength is Brillouin scattered light.

6. A method as claimed in claim 1, in which the scattered light is backscattered.

7. A method as claimed in claim 1, in which the scattered light is forwardscattered.

8. A method of measuring temperature, comprising the steps of:
   providing an elongate optical fiber, having an end, for use as a temperature sensing element;
   consecutively launching input pulses of light at two different wavelengths $\lambda_1$ and $\lambda_2$ into said end of said temperature sensing element;
   maintaining a predetermined position along the optical fibre from said end at a predetermined temperature to provide a reference for deriving temperature measurements at other positions along the optical fibre;
   passing scattered light from said element and deriving from said input pulses, at a third wavelength $\lambda_3$ intermediate said two different wavelengths, to an intensity detector, $\lambda_3$ being chosen such that $$1/\lambda_1 - 1/\lambda_3 = 1/\lambda_3 - 1/\lambda_2 = \nu$$

where $\nu$ is the Stokes shift in wavenumber units of the Stokes scattered light for a pulse of wavelength $\lambda_1$;
   obtaining from said detector output signals indicative of the intensity of the scattered light at said third wavelength deriving from said input pulses; and
   processing said output signals to provide a temperature measurement.

9. Apparatus for measuring temperature comprising:
   a temperature sensing element;
   means for applying to said temperature sensing element input pulses of light at two different wavelengths $\lambda_1$ and $\lambda_2$ to obtain scattered light from said temperature sensing element; means for detecting the scattered light;
   means for deriving from the detected scattered light signals indicative of the intensity of light within the scattered light occurring at a third wavelength $\lambda_3$, intermediate $\lambda_1$ and $\lambda_2$, $\lambda_3$ being chosen such that $1/\lambda_1 - 1/\lambda_3 = 1/\lambda_3 - 1/\lambda_2 = \nu$ where $\nu$ is the Stokes shift in wavenumber units of the scattered light for a pulse of wavelength $\lambda_1$; and
   means for processing the derived signals to provide a measurement of the temperature sensed by said temperature sensing element.

10. Apparatus as claimed in claim 9, wherein
    said detecting means includes means for detecting backscattered light at wavelengths $\lambda_1$ and $\lambda_2$;
    said deriving means further comprises means for deriving an additional output signal indicative of the intensity of the total backscattered light; and
    said processing means further comprises means for processing the derived additional output signal to compensate for effects of attenuation of light in said element.

11. Apparatus as claimed in claim 9, in which said applying means comprises a single tunable source of monochromatic light.

12. Apparatus as claimed in claim 9, in which said applying means comprises two separate light sources, one of said separate sources providing light at wavelength and the other of said sources providing light at wavelength.

13. Apparatus as claimed in claim 12, further comprising a dichroic beamsplitter interposed between said light sources and said temperature sensing element.

14. Apparatus as claimed in claim 9, further comprising a monochromator interposed in a path of the scattered light from said temperature sensing element to said detecting means.

15. Apparatus as claimed in claim 9, in which temperature sensing element is an elongate optical fibre.

16. A method of measuring temperature sensed by a temperature sensing element comprising the steps of:
applying to said temperature sensing element input pulses of light of a single wavelength to obtain scattered light from the temperature sensing element;
detecting the scattered light;
deriving from the detected scattered light signals indicative of the intensity of the Stokes and anti-Stokes shifted Brillouin scattered light; and
processing the derived signals to provide a measurment of the temperature sensed by said temperature sensing element.

17. A method of measuring temperature sensed by a temperature sensing element comprising the steps of:
applying to said temperature sensing element input pulses of light to obtain scattered light from said temperature sensing element;
detecting the scattered light;
deriving from the detected scattered light signals indicative of the intensity of the scattered light;
determining the ratio between intensity measurements taken between an anti-Stokes scattered intensity measurement and a Rayleigh scattered intensity measurement in the scattered light; and
deriving the temperature sensed by said temperature sensing element from the determined ratio.

18. A method as claimed in claim 17, in which the scattered light is Raman scattered.

19. A method as claimed in claim 17, in which the scattered light is Brillouin scattered.

20. A method of measuring the temperature sensed by a temperature sensing element comprising the steps of:
maintaining a first predetermined part of said temperature sensing element at a predetermined temperature to provide a reference for use in measuring the temperature sensed at other parts of said temperature sensing element;
applying to said temperature sensing element input pulses of light to obtain scattered light from said first predetermined part and from a second part of said temperature sensing element;
detecting the scattered light;
deriving from the detected scattered light signals indicative of the intensity of the scattered light from said first predetermined part and said second part; and
processing the derived signals, with the derived signal from said first predetermined part providing a reference signal to provide a measurement of the temperature at said second part.

21. A method as claimed in claim 10, in which the scattered light is backscattered.

22. A method as claimed in claim 20, in which the scattered light is forwardscattered.

23. A method as claimed in claim 20, in which the scattered light is Raman scattered.

24. A method as claimed in claim 20, in which the scattered light is Brillouin scattered.

25. A method as claimed in claim 20, in which the input pulses have the same wavelength.

26. A method as claimed in claim 20, in which an elongate optical fibre is the temperature sensing element.

* * * * *